C. SCHEVITZ.
SPRING WHEEL.
APPLICATION FILED JAN. 3, 1914.

1,109,549.

Patented Sept. 1, 1914.

Witnesses
J. H. Crawford
P. M. Smith

Inventor
Carl Schevitz,
By Victor J. Evans
Attorney

UNITED STATES PATENT OFFICE.

CARL SCHEVITZ, OF JACKSONVILLE, FLORIDA.

SPRING-WHEEL.

1,109,549.   Specification of Letters Patent.   Patented Sept. 1, 1914.

Application filed January 3, 1914. Serial No. 810,202.

*To all whom it may concern:*

Be it known that I, CARL SCHEVITZ, a citizen of the United States, residing at Jacksonville, in the county of Duval and State of Florida, have invented new and useful Improvements in Spring-Wheels, of which the following is a specification.

This invention relates to spring wheels, the object of the invention being to provide a simple construction of wheel of the class described whereby all ordinary road shocks and jars are absorbed between the hub and rim or felly of the wheel, the construction also insuring the thorough bracing of the wheel as a whole both against transverse and longitudinal strains.

With the above and other objects in view, the invention consists in the construction, combination and arrangement of parts, as will be hereinafter more fully described, illustrated and claimed.

Figure 1:
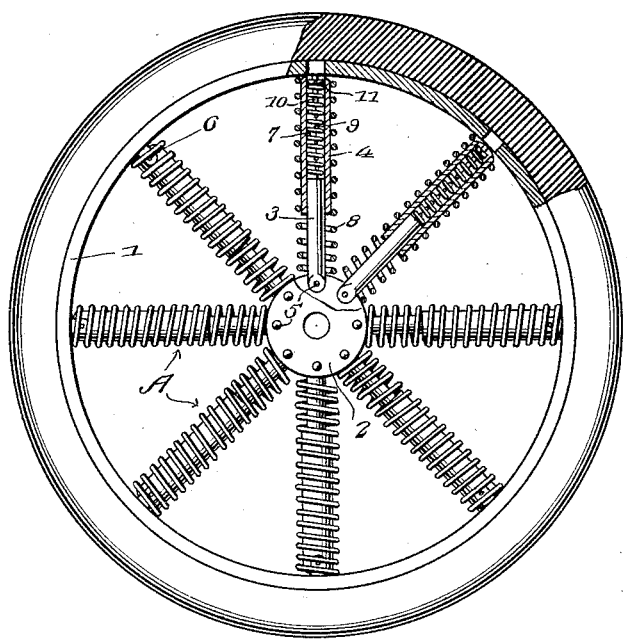
Figure 2:
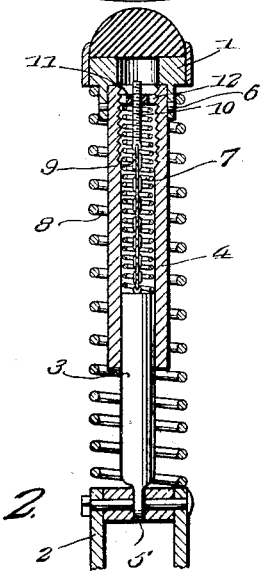

In the accompanying drawings:—Figure 1 is a side elevation partly in section of a spring wheel embodying the present invention. Fig. 2 is a diametrical section through one of the spokes showing also the hub and rim and the parts intimately associated therewith.

Referring to the drawings 1 designates a continuous or endless rim, 2 the wheel hub and A, generally, a series of spokes each of which comprises an inner member or section 3 and an outer member or section 4. The inner section 3 may, if desired, be solid or tubular while the outer section 4 is tubular so as to form a socket into which the inner section 3 is adapted to telescope and slide. The inner section 3 is pivotally connected at 5 to the hub while the outer section 4 is pivotally connected at 6 to the rim or felly 1. Within the outer end portion of each section 4 is arranged a coiled expansion spring 7, said spring being confined between the outer extremity of the spoke section 3 and the rim 1. In addition to the spring 7, another larger and longer coiled expansion spring 8 encircles both sections 3 and 4 of each spoke, being confined between the hub and the rim.

In order to adjust the tension of the spring 7, a chain 9 has one end attached to the outer extremity of each spoke section 3 and is provided at its outer end with a threaded rod or bolt 10 upon which is threaded a nut 11. This nut has its outer edge notched as indicated at 12 to enable it to be turned with the aid of a suitable spanner or wrench. As said nut bears against the outer extremity of the spring 7, it will be seen that by means of said nut, the spring 7 may be initially compressed or relaxed to any desired extent according to the weight of the vehicle and the load contained in the vehicle. In this way the wheel as a whole may be adapted to different loads while retaining the necessary shock absorbing qualities referred to.

Any desired form or construction of tire may be placed upon the rim or felly 1, preferably a solid or cushion tire of rubber or any other suitable material.

What I claim is:—

A spring wheel comprising an endless rim, a hub arranged centrally thereof, a series of spokes each embodying telescopic sections one of which has a jointed connection with the felly and the other of which has a jointed connection with the hub, expansion springs arranged in the tubular spoke sections and acting on the other spoke sections slidable therein, stay chains connected at one end to the outer extremities of the inner spoke sections, threaded rods at the outer ends of said chains, and nuts threaded on said rods and adjustable in the tubular spoke sections and bearing against the outer extremities of said springs.

In testimony whereof I affix my signature in presence of two witnesses.

CARL SCHEVITZ.

Witnesses:
L. ELSON,
GUSTAVE H. MEISTER.

---

Copies of this patent may be obtained for five cents each, by addressing the "Commissioner of Patents, Washington, D. C."